United States Patent [19]

VanOrder et al.

[11] Patent Number: 4,847,737
[45] Date of Patent: Jul. 11, 1989

[54] VEHICLE VANITY WITH LIGHT CONTROL

[75] Inventors: Kim L. Van Order, Hamilton; Steven P. Dykstra, Zeeland; Ted A. Dekker, Grand Rapids, all of Mich.

[73] Assignee: Prince Corporation, Holland, Mich.

[21] Appl. No.: 185,854

[22] Filed: Apr. 25, 1988

[51] Int. Cl.⁴ .............................................. F21V 33/00
[52] U.S. Cl. ..................................... 362/137; 362/141; 362/144
[58] Field of Search .................. 362/137, 66, 135, 136, 362/138, 139, 140, 141, 142–144, 66, 135, 144; 315/71, 309

[56] References Cited

U.S. PATENT DOCUMENTS

| | | | |
|---|---|---|---|
| 3,975,658 | 8/1976 | Emtage et al. | 315/71 |
| 4,000,404 | 12/1976 | Marcus | 240/2 R |
| 4,213,169 | 7/1980 | Kempkers | 362/140 |
| 4,227,241 | 10/1980 | Marcus | 362/137 |
| 4,227,242 | 10/1980 | Marcus | 362/61 |
| 4,516,054 | 5/1985 | Shikama et al. | 315/71 |
| 4,586,788 | 5/1986 | Hansen | 350/283 |
| 4,760,503 | 7/1988 | VandenBerge et al. | 362/137 |

*Primary Examiner*—Ira S. Lazarus
*Assistant Examiner*—David G. Messer
*Attorney, Agent, or Firm*—Price, Heneveld, Cooper, DeWitt & Litton

[57] ABSTRACT

A light intensity control includes a current control device which delays the application of the maximum level of current to one or more lamps of an illuminated vanity mirror. In the preferred embodiment, the current responsive control device comprises a negative temperature coefficient thermistor coupled in series with the lamps.

13 Claims, 1 Drawing Sheet

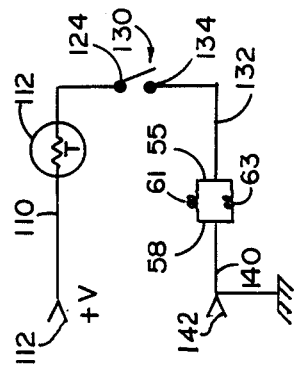
FIG. 3
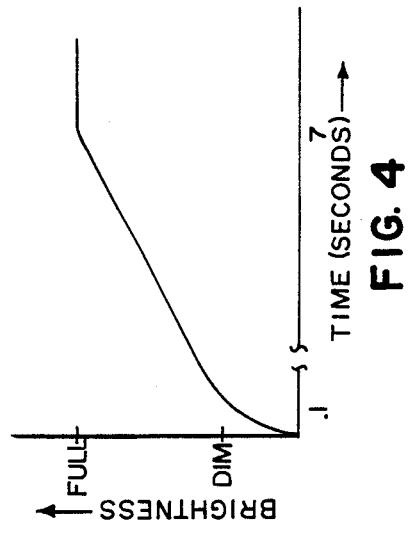
FIG. 4
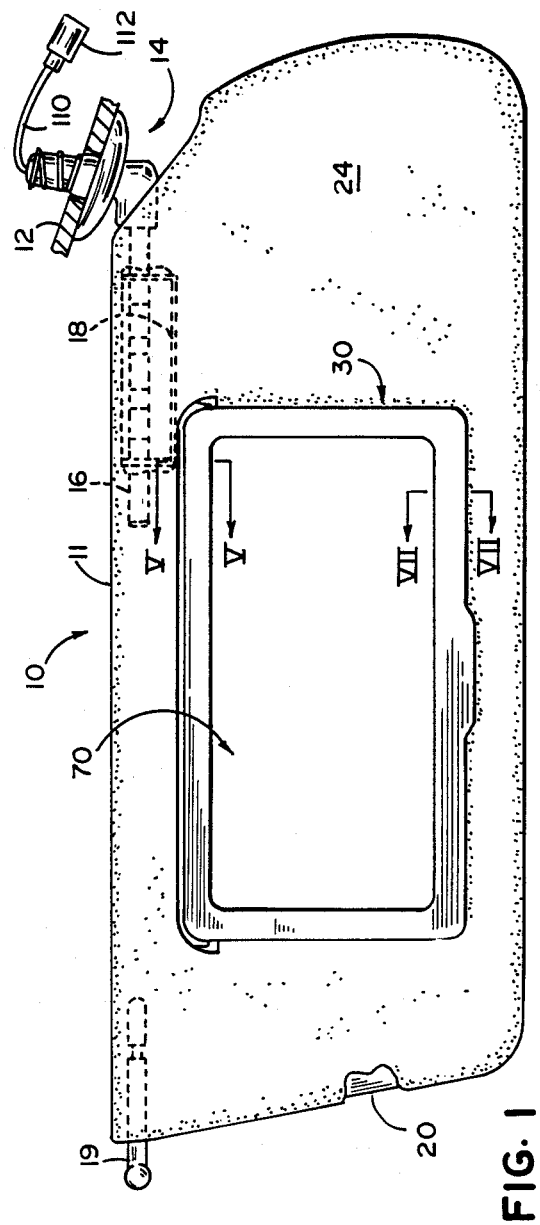
FIG. 1
FIG. 2

VEHICLE VANITY WITH LIGHT CONTROL

BACKGROUND OF THE INVENTION

The present invention pertains to a light control circuit for use in connection with an illuminated vanity mirror.

Typically, illuminated vanity mirrors and those mounted within visors for vehicles include first and second light levels for providing either a dimmer or brighter light. If, for example, the light control switch on the vanity mirror visor described in U.S. Pat. No. 4,227,241 is left in the bright position and the cover opened, the user may, upon first opening the covered illuminated vanity mirror, experience some discomfort due to the relative brightness of the lamps particularly when the visor is being used in a dark vehicle. In order to alleviate this problem, a cover control was devised as shown in U.S. Pat. No. 4,227,242, in which when the cover is initially opened the light control is at a lower level and as it is fully opened the light increases to full intensity. Also, the illuminated vanity mirror visor of U.S. Pat. No. 4,586,788 provides a control which assures that when the cover is initially open, the bright-/dim switch is always in the dim position. Although both of these systems solve the problem of exposing the user to an initially bright light as the cover is opened, they require separate electromechanical controls to achieve this desired result.

SUMMARY OF THE INVENTION

The system of the present invention, however, provides a light intensity control which delays the application of the maximum level of current to the lamps of an illuminated vanity mirror by coupling in series with the electrical current path for the lamps, a current responsive device which initially limits current flowing through the lamps but upon activation of the lamps allows the current to gradually increase to provide full light intensity for the lamps. In the preferred embodiment, the current responsive control device comprises a negative temperature coefficient thermistor. With such a system, the need for additional electromechanical means for controlling the light intensity of the function cover movement, for example, is unnecessary and the device can be employed in any lighted vanity embodiment in which the lamps are activated by a switch and are uncovered. Thus, the present invention can be employed with any illuminated vanity mirror which includes switching means which normally provides full brightness when activated but can be controlled using the present invention to momentarily reduce the level of illumination and allow it to gradually increase preventing, discomfort for the user.

These and other features, objects, and advantages of the present invention will become apparent upon reading the following description thereof together with the reference to the accompanying drawings in which:

BRIEF DESCRIPTION OF THE DRAWINGS

FIG. 1 is a front elevational view partly broken away and partly in phantom form of a visor embodying the present invention;

FIG. 2 is a front elevational view of the visor shown in FIG. 1 shown with the mirror cover moved to an open position and with the mirror partly broken away and one lens removed to show the positioning of the electrical circuit elements associated with the illuminated vanity mirror visor;

FIG. 3 is an electrical circuit diagram in schematic form of the circuit employed in the present invention; and FIG. 4 is a graph showing the apparent brightness output level as a function of time.

DETAILED DESCRIPTION OF THE PREFERRED EMBODIMENT

Referring initially to FIG. 1, there is shown a visor 10 mounted to the roof 12 of a vehicle, such as an automobile, by a conventional elbow bracket pivot assembly 14 which includes a horizontal axle 16 extending within the body of the visor near the upper edge 11 thereof. Visor 10 pivots on axle 16 by means of a torque device 18 which can be of the type described in U.S. Pat. No. 4,500,131 issued Feb. 19, 1985 and entitled Visor Control. This device permits the visor to be moved from a raised stored position against the vehicle headliner when not in use, to a selected lowered use position as illustrated in FIGS. 1 and 2. The left edge of visor 10 opposite assembly 14 includes a stub axle 19 which fits within a suitable clip mounted to the vehicle for supporting the opposite end of the visor.

Visor 10 includes a body made of a polymeric core 20 molded in two halves and hinged together along one edge and which includes a generally rectangular recess 22 (FIG. 2) centrally located in one side thereof for receiving a covered illuminated vanity mirror assembly 30. The visor core 20 is covered by a suitable upholstery material 24 to conform the visor's appearance to that of the interior of the vehicle in which it is installed. Recess 22 of the visor core 20 includes a floor 23 (FIG. 2) onto which the circuit elements of assembly 30 are installed as described below. The construction of the illuminated vanity mirror assembly 30 which may include a cover 70 or which may be uncovered, is described in greater detail in copending U.S. Pat. No. 4,760,503 filed Sept. 26, 1986 and entitled Visor for a Vehicle, the disclosure of which is incorporated herein by reference. A brief description of the vanity mirror assembly is, however, now presented.

Assembly 30 includes a generally rectangular mirror frame defined in part by a rectangular flange 45 having a central generally rectangular opening 42 for receiving and holding a rectangular mirror 44 therein. Mirror 44 is inserted from the rear and held in place along the edges of the opening 42 by heat deformed tabs (not shown). Adjacent and spaced one each side of aperture 42 are lens receiving apertures 43 for receiving left and right side lenses 51 which snap-fit within the apertures 43 and are keyed by means of keying tabs and slots at their edges such that the lenses, when installed, direct illumination from lamps 61 and 63 positioned behind the lenses outwardly and centrally toward the face of a user of mirror 44. The polymeric molded mirror frame also includes a pair of integral pivot axles 48 spaced along the top edge of the flange 45 and generally aligned above lens apertures 43.

Snap-fitted to axles 48 is the molded polymeric cover 70 which integrally includes sockets 90 which snap over and circumscribe a portion of each of the cylindrical axles 48. Sockets 90 integrally include camming means which selectively engage leaf-type bias springs 80 mounted to the visor frame behind axles 48 to engage the camming surface of sockets 90 as described in greater detail in the above identified patent application to urge cover 72 in either a snapped open position illustrated in FIG. 2 or a snapped closed position against the upholstery material 24 as illustrated in FIG. 1.

The electrical system for actuating lamps 61 and 63 is best seen with reference to FIGS. 2 and 3 and includes a positive supply conductor 110 extending through a central opening in the hollow pivot rod assembly 14 and 16 and terminates in a connector 112 coupled to the supply conductor from the vehicle's electrical system. Conductor 110 extends into the hollow core 20 of visor 10 and is held to the floor 23 of the visor core by a plurality of spaced integral resilient snap-in sockets 114. Between a pair of such sockets 114 there is positioned in series with the input conductor 110 a solid-state current control device 112 comprising, in the preferred embodiment, a negative temperature coefficient thermistor. Thermistor 112 is generally disk-shaped and includes integral leads which are soldered to ends of the conductor 110 formed to receive the thermistor in series.

Conductor 110 extends to the switch assembly 130 which includes a movable contact portion 124 and a fixed contact portion 134 which engage one another to close switch 130 when the cover is an open position as illustrated in FIG. 2. The movable contact 124 is engaged by arms extending from the cover 70 to open switch 130 by moving contact 124 to an open position as described in greater detail in the above identified patent application when the cover is in a closed position as illustrated in FIG. 1. The movable contact 124 includes a leg 122 extending away from the fixed contact and which is held in position by a pair of lugs 126 and 128 for holding the movable contact to the floor 23 of the core with conductor 110 suitably coupled to the conductive contact 124. A conductor 132, also held to core 20 by means of a resilient socket 114, extends to one terminal of lamp sockets 52 and 54 which are coupled in parallel by a common conductor 55. The remaining terminal of each of the sockets are also commonly coupled in parallel by conductor 58 to which there is coupled a conductor 140 extending to a ground terminal 142 coupled to the metallic pivot rod 16 for providing a ground return path for the circuit as represented by the schematic diagram of FIG. 3.

The current control device 112 can be any device which is coupled in the current flow path from the vehicle's operating power source to the lamps illuminating the vanity mirror and which provides an initially reduced current flow through the lamps so the lamps initially are of relatively low light intensity and which automatically increases the current to provide full intensity after a brief period of time. The current control device 112 of the preferred embodiment is a negative temperature coefficient thermistor having an initial resistance of approximately one hundred ohms at an ambient temperature of 25 C. One such thermistor employed in the tests illustrated by the results of FIG. 4 was manufactured by Fenwal Electronics, Part No. 145-101FAG-A01, although other similar devices could be employed. The lamps were each .7CP GE-type 74. The observed brightness of the lamps is shown in FIG. 4 which represents an apparent linear increase in light intensity with time, after the initial turn-on, and an elapsed time of approximately seven seconds for full intensity to be reached. This time delay is sufficient to allow the pupil to react to the illumination of the mirror by the lamps as cover 70 is opened without discomfort. Naturally, different time delays can be provided with the selection of different current control devices, such as by using different particular thermistor configurations.

The circuit of the invention can be employed in an illuminated vanity system in which four lamps are employed, with two lamps being illuminated for low brightness, and four lamps being illuminated for high brightness with the thermistor being positioned in series circuit with either just the second set of lamps to provide the additional illumination, or with all four lamps to provide the desired delay in full intensity with activation of the lamps. The lamps can be actuated by a cover actuated switch or in uncovered systems by a manually actuated switch. Although the preferred embodiment of the invention employs a serially coupled N.T.C. thermistor, a parallel coupled thermistor with a positive temperature coefficient could also be employed.

It will become apparent to those skilled in the art that various other modifications to the preferred embodiment of the invention can be made without departing from the spirit or scope thereof as defined by the appended claims.

The embodiments of the invention in which an exclusive property or privilege is claimed are defined as follows:

1. An illuminated vanity mirror visor comprising:
   a visor body including a mirror and lamp means for illuminating said mirror;
   means for supplying electrical current to said lamp means including switch means for selectively supplying electrical current to said lamp means; and
   a current control device coupled to said lamp means such that when power is initially applied by the closing of said switch means, current flowing through said lamp means progressively increases to a maximum over a period of time selected to delay the light output from said lamp means to allow gradual pupillary reaction of the user thereby preventing discomfort.

2. The visor as defined in claim 1 wherein said current control device is a solid-state device.

3. The visor as defined in claim 2 wherein said current control device is a thermistor.

4. The visor as defined in claim 3 wherein said thermistor is a negative temperature coefficient thermistor coupled in series with said lamp means.

5. The visor as defined in claim 4 wherein said visor includes a mirror cover and said cover actuates said switch means to turn said switch on when said cover is opened.

6. An illuminated vanity mirror visor comprising:
   a visor body including a mirror and lamp means for illuminating said mirror;
   a cover for said mirror, said cover movable between an open position exposing said mirror for use and a closed position covering said mirror;
   means for supplying electrical current to said lamp means including switch means actuated by movement of said cover for selectively supplying electrical current to said lamp means when said cover is in said open position; and
   a current control device coupled to said lamp means such that when power is initially applied by the closing of said switch means, current flowing through said lamp means progressively increases to a maximum over a period of time selected to delay the light output from said lamp means to allow gradual pupillary reaction of the user thereby preventing discomfort.

7. The visor as defined in claim 6 wherein said current control device is a solid-state device.

8. The visor as defined in claim 7 wherein said current control device is a thermistor.

9. The visor as defined in claim 8 wherein said thermistor is a negative temperature coefficient thermistor coupled in series with said lamp means.

10. A lamp control circuit for use in connection with an illuminated vanity mirror for a vehicle comprising:
   vehicle power supply means for supplying direct current electrical power;
   a vanity mirror including at least one lamp means;
   switch means for coupling said power supply to said lamp means for supplying electrical current thereto; and
   a current control device coupled to said lamp means such that when power is initially applied by the closing of said switch means, current flowing through said lamp means progressively increases to a maximum over a period of time selected to delay the light output from said lamp means to allow gradual pupillary reaction of the user thereby preventing discomfort.

11. The circuit as defined in claim 10 wherein said current control device is a solid-state device.

12. The circuit as defined in claim 11 wherein said current control device is a thermistor.

13. The circuit as defined in claim 12 wherein said thermistor is a negative temperature coefficient thermistor coupled in series with said lamp means.

* * * * *